(12) United States Patent
Wildemann

(10) Patent No.: US 11,130,446 B2
(45) Date of Patent: Sep. 28, 2021

(54) SYSTEM TO DETECT OBJECTS EJECTED FROM A VEHICLE

(71) Applicant: Robert Bosch GmbH, Stuttgart (DE)

(72) Inventor: Sören Wildemann, Novi, MI (US)

(73) Assignee: Robert Bosch GmbH, Stuttgart (DE)

(*) Notice: Subject to any disclaimer, the term of this patent is extended or adjusted under 35 U.S.C. 154(b) by 181 days.

(21) Appl. No.: 16/601,742

(22) Filed: Oct. 15, 2019

(65) Prior Publication Data

US 2021/0107404 A1 Apr. 15, 2021

(51) Int. Cl.
*B60R 1/00* (2006.01)
*B60S 5/00* (2006.01)

(52) U.S. Cl.
CPC ............... *B60R 1/002* (2013.01); *B60S 5/00* (2013.01); *B60R 2300/50* (2013.01)

(58) Field of Classification Search
CPC .......... G06K 9/00832; G06K 9/00838; G06K 9/00845; G06K 9/00624; B60R 1/002; B60R 2300/8006; B60R 2300/105; B60R 2001/1253
USPC ........................................................ 348/148
See application file for complete search history.

(56) References Cited

U.S. PATENT DOCUMENTS

| 9,255,810 B2 | 2/2016 | Van Wiemeersch et al. |
| 2003/0102970 A1 | 6/2003 | Creel et al. |
| 2003/0168838 A1* | 9/2003 | Breed ............... B60R 21/01526 280/735 |
| 2015/0066349 A1* | 3/2015 | Chan ...................... G01C 21/26 701/400 |
| 2016/0332589 A1* | 11/2016 | Van Wiemeersch ... G07C 5/008 |
| 2020/0012871 A1* | 1/2020 | Lee ........................... G06T 7/70 |

FOREIGN PATENT DOCUMENTS

| JP | 2015007874 A | * | 1/2015 |
| WO | 2015025435 A1 | | 2/2015 |

OTHER PUBLICATIONS

Perrett et al. "Detection of Valuable Left-Behind Items in Vehicle Cabins" 2017 IEEE, 8 Pages.*
Litter Drone, "About," available at http://litterdrone.com, available at least as early as Aug. 2019 (2 pages).
Chung, A. et al., "Cloud Computed Machine Learning Based Real-Time Litter Detection using Micro-UAV Surveillance," 2018 (10 pages).

* cited by examiner

*Primary Examiner* — Nathnael Aynalem
(74) *Attorney, Agent, or Firm* — Maginot, Moore & Beck LLP

(57) ABSTRACT

A method for detecting objects ejected from a cabin of a vehicle includes generating window image data of a vehicle window opening of the vehicle with a camera mounted on the vehicle; and processing the window image data with a controller operably connected to the camera to generate ejected object data corresponding to at least one object ejected from the cabin through the vehicle window opening. The method further includes associating the ejected object data with occupant data of an occupant of the vehicle with the controller.

20 Claims, 3 Drawing Sheets

SYSTEM TO DETECT OBJECTS EJECTED FROM A VEHICLE

FIELD

This disclosure relates to the field of vehicles and computer vision and, in particular, to identifying objects, such as waste and litter, ejected from a vehicle using computer vision.

BACKGROUND

Ride hailing services and ride sharing services are increasing in popularity as a means of transportation for people in urban environments. Moreover, in connection with autonomous vehicle technology, self-driving taxis and shuttles are envisioned in the near future. Ride sharing services and the prospect of shared autonomous vehicles have resulted in new business models and corresponding challenges.

One of the challenges in maintaining a fleet of shared vehicles, both human driven and autonomously controlled, is keeping the vehicles clean and free from the waste of previous occupants. For example, some shared vehicles use cameras or other systems to identify waste left behind inside the vehicle cabin by an occupant. The occupant may be assessed a service charge for cleaning the vehicle if the occupant leaves the vehicle in a sufficiently dirty condition.

In order to avoid the service charge when utilizing a shared vehicle, most occupants clean up after themselves by disposing of their waste in a proper receptacle, such as a waste bin. Other occupants, however, take a different approach to avoid assessment of the service charge. In particular, some occupants eject waste and debris from the vehicle while the vehicle is in motion. Such an approach leaves the vehicle cabin clean and free of debris, but results in an untended consequence of increased litter along roadways and in neighborhoods.

The current business model for keeping shared vehicles clean incentivizes some occupants to dispose of waste in an unintended way. As a result, further developments in the area of shared vehicles and autonomous vehicles are desired as an effort to protect the environment, to save costs on communities for cleanup, and/or to provide overall cleaner neighborhoods and surroundings.

SUMMARY

According to an exemplary embodiment of the disclosure, a method for detecting objects ejected from a cabin of a vehicle includes generating window image data of a vehicle window opening of the vehicle with a camera mounted on the vehicle; and processing the window image data with a controller operably connected to the camera to generate ejected object data corresponding to at least one object ejected from the cabin through the vehicle window opening. The method further includes associating the ejected object data with occupant data of an occupant of the vehicle with the controller.

According to another exemplary embodiment of the disclosure, a method for detecting objects ejected from a cabin of a vehicle includes generating window image data of a vehicle window opening when a corresponding movable window panel is in an open position, and processing the window image data to generate ejected object data corresponding to objects ejected from the cabin through the vehicle window opening. The method further includes generating littering event data based on the generated ejected object data, and associating the littering event data with an operator of the vehicle.

According to a further exemplary embodiment of the disclosure, a system for detecting objects ejected from a cabin of a vehicle includes a camera and a controller. The camera is mounted on the vehicle and is configured to generate window image data of a vehicle window opening. The controller is operably connected to the camera to receive the window image data. The controller is configured (i) to process the window image data to generate ejected object data corresponding to at least one object ejected from the cabin through the vehicle window opening, and (ii) to associate the ejected object data with occupant data of an occupant of the vehicle.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

Figure 1:
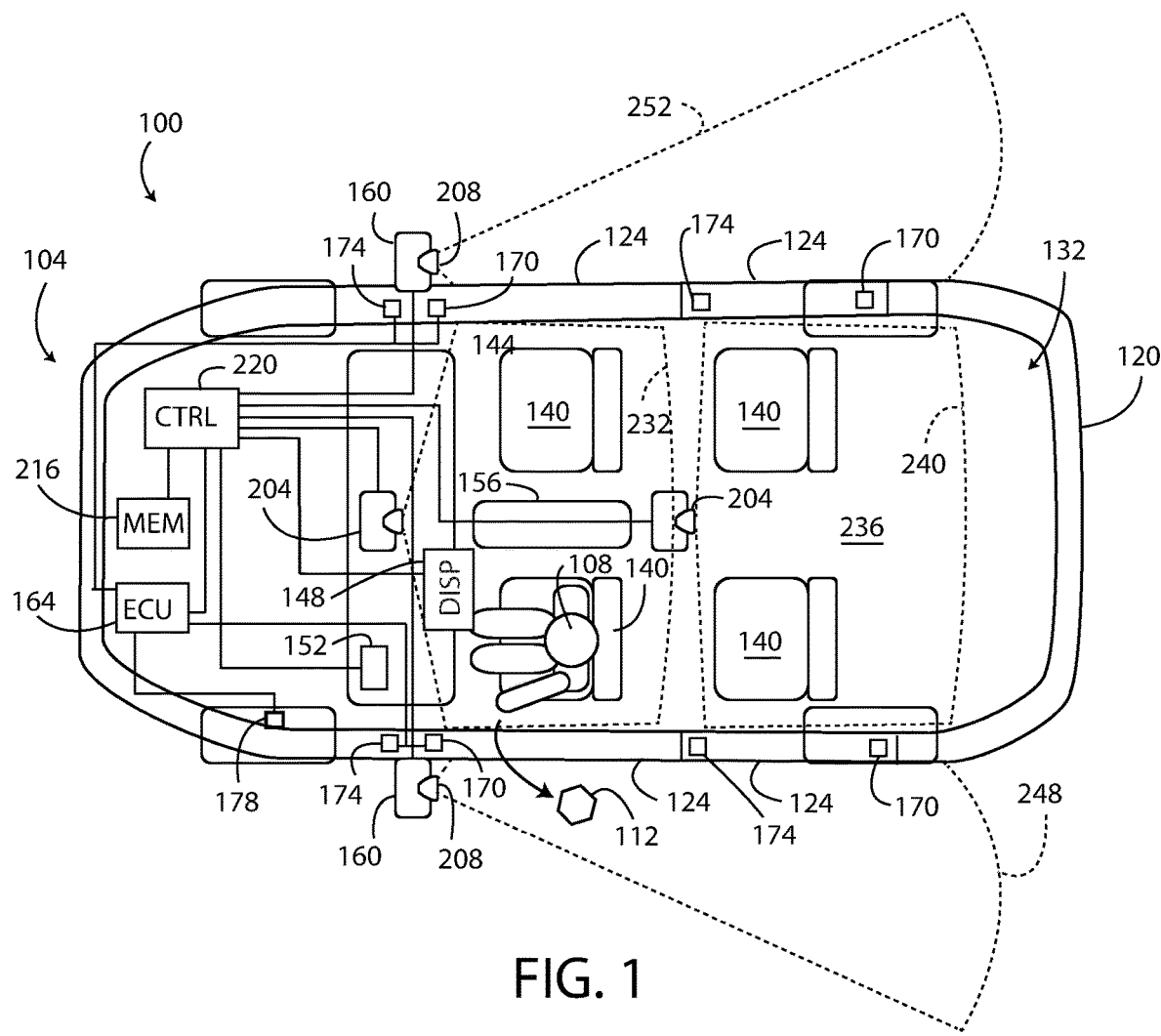
FIG. 1 is a top view block diagram illustrating an exemplary embodiment of a vehicle including a system for detecting objects ejected from a cabin of a vehicle, as disclosed herein.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are described in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a vehicle 100 includes a system 104 configured to detect when an occupant 108 of the vehicle 100 ejects an object 112 from the vehicle 100 while the vehicle 100 is in motion. The system 104 determines when occupant 108 litters by detecting, using computer vision, when the occupant 108 moves items from within the vehicle 100 to outside of the vehicle 100 through window openings 116 (FIG. 2) while the vehicle 100 is in motion. In one embodiment, the system 104 displays a message to the occupant 108 of the vehicle 100 to instruct the occupant 108 to stop the littering activity. The system 104 also associates the object 112 with the identity of the occupant 108, thereby enabling the business operating the vehicle 100 to follow up with the occupant 108 in an appropriate manner, such as by assessing a service charge against the occupant or by preventing the occupant 108 from again utilizing the vehicle 100. The litter sensing system 104 provides an incentive for occupants 108 of the vehicle 100 to dispose of waste (i.e. the object 112) in a proper receptacle instead of tossing the object 112 on the roadway and in neighborhoods, so as to avoid the service charge. Each aspect of the system 104 and a method 400 (FIG. 4) of operating the system 104 are described herein.

Figure 2:
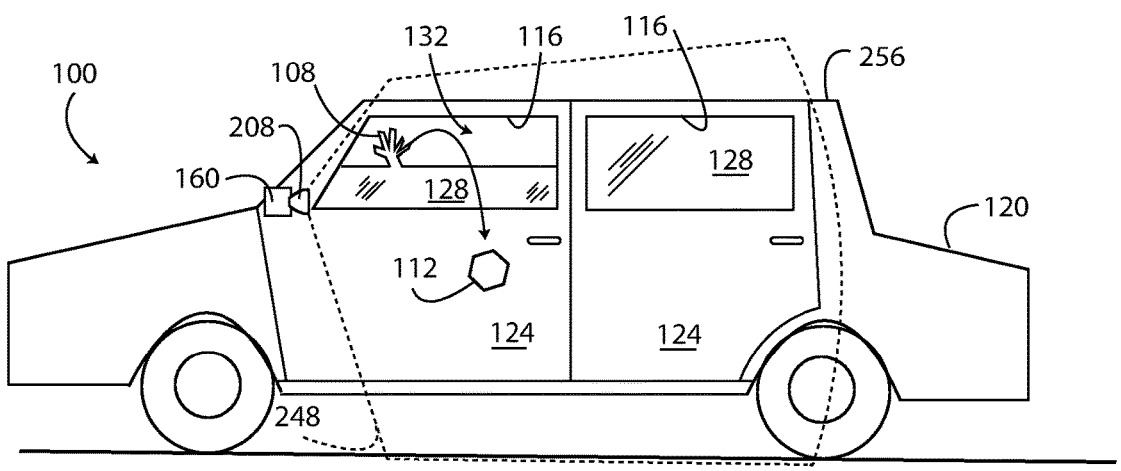
FIG. 2 is a side view block diagram illustrating the vehicle and system of FIG. 1, and illustrating an occupant ejecting an object from the vehicle while the vehicle is in motion through a front window panel in an open window state.

With reference to FIGS. 1 and 2, an exemplary vehicle 100 including the system 104 is illustrated. The vehicle 100, in one embodiment, is a shared vehicle 100 that may be occupant 108 controlled (i.e. levels zero through four autonomous control) or fully autonomously controlled (i.e. level five autonomous control). In other embodiments, the vehicle 100 is a rental car, a shuttle, a limousine, a corporate vehicle, a livery vehicle, a taxi, or a personal vehicle. The vehicle 100 is any vehicle that carries human occupants 108.

The vehicle 100 includes a chassis 120 having doors 124 and window panels 128, and defining an interior cabin 132. As shown in FIG. 2, the left front door 124 defines the window opening 116 in which the movable window panel 128 is positionable in an open window state and a closed window state. In FIG. 2, the left front window panel 128 is in the open window state and the left rear window panel 128 of the left rear door 124 is in the closed window state. In some embodiments, the vehicle 100 includes a further window opening 116 and a corresponding further window panel 128 located in a ceiling of the vehicle 100 and referred to as a sunroof or a moonroof. The sunroof and/or moonroof is included in the window opening 116 and the window panel 128.

As shown in FIG. 1, the vehicle 100 further includes occupant seats 140 located within the cabin 132, a dashboard 144 including a display screen 148, at least one speaker 152, a center console 156, side mirror housings 160, and an electronic control unit ("ECU") 164. In the exemplary vehicle 100, four occupant seats 140 are included. In other embodiments, the vehicle 100 may include any desired number of occupant seats 140 in any configuration.

The dashboard 144 is located at the front of the vehicle 100 and includes instruments and controls for operating and/or interacting with the vehicle 100.

With continued reference to FIG. 1, in one embodiment, the display screen 148 is integrated into the dashboard 144. The display screen 148 displays vehicle data to the occupants 108 of the vehicle 100. In an occupant-controlled vehicle 100, the display screen 148 displays vehicle speed, remaining charge, navigation information (from a global positioning system "GPS"), and other messages to the driver 108 and the other occupants 108 of the vehicle 100. In an autonomous vehicle 100, the display screen 148 displays information to the occupants 108 of the vehicle 100, such as the time remaining to destination and instructions for interacting with the vehicle 100. The display screen 148 is configurable to display any desired information to the occupants 108 of the vehicle 100. In one embodiment, the display screen 148 is provided as a liquid crystal display or any other information display technology.

The at least one speaker 152 is at least partially located in the cabin 132. The speaker 152 generates sound to provide auditory information and entertainment to the occupant 108.

The center console 156 is located between the front two occupants seats 140. The center console 156 may include a space for holding occupant possessions, such as smartphones, wallets, and/or beverage containers (i.e. object 112).

The side mirror housings 160 are mounted on the vehicle 100 and include a mirror (not shown) positioned to provide a view along the side and to the rear of the vehicle 100. In some embodiments, such as a fully autonomous vehicle 100, the side mirror housings 160 include cameras, such as the mirror cameras 208 described below, instead of mirrors.

The ECU 164 is configured to control electronic components of the vehicle 100. For example, the ECU 164 is configured to control an internal combustion engine (not shown) and/or a traction motor (not shown) to result in desired movement of vehicle 100. In one embodiment, the ECU 164 is connected to at least one window state sensor 170 that monitors a status of the movable window panels 128, and to at least one door state sensor 174 that monitors a status of the doors 124. The ECU 164 is also connected to a speed sensor 178 that monitors a speed of movement of the vehicle 100. The ECU 164 generates data corresponding to the position of each movable window panel 128 (i.e. open or closed), the status of each door 124 (i.e. open or closed), and the speed of the vehicle 100. The ECU 164, in one embodiment, is electrically connected to the window state sensor 170, the door state sensor 174, and the speed sensor 178 by a CAN bus (controller area network bus).

Figure 3:
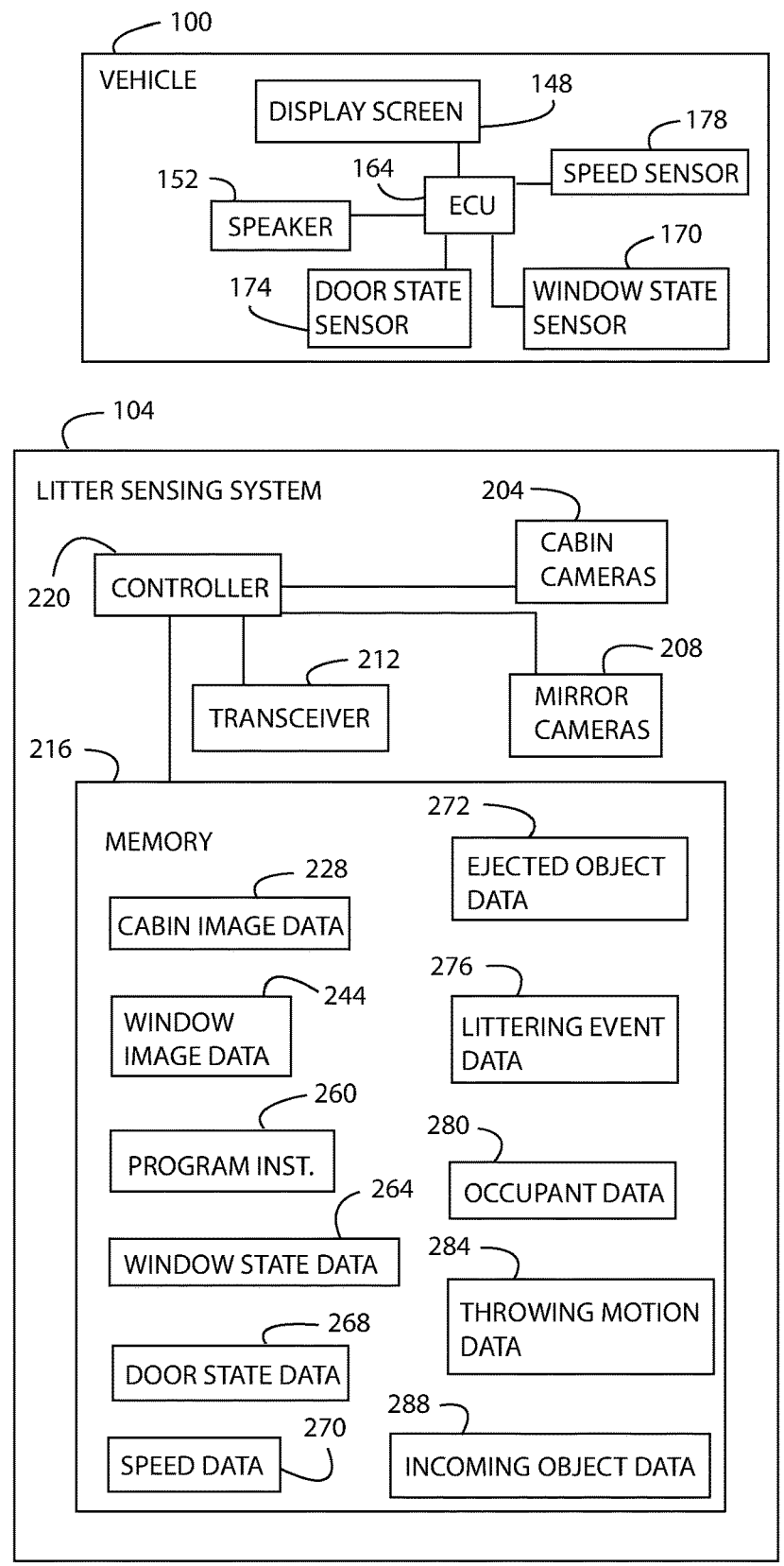
FIG. 3 is a block diagram illustrating the vehicle and the system of FIG. 1.

As shown in FIGS. 1 and 3, the litter sensing system 104 is mounted on the vehicle 100 and includes cabin cameras 204, mirror cameras 208, a transceiver 212, and a memory 216 each operatively connected to a controller 220. The cabin cameras 204, which are mounted on the vehicle 100 within the cabin 132, are digital imaging devices configured to generate cabin image data 228. The cabin cameras 204 are positioned to observe the behavior and movements of the occupant 108 and to generate the cabin image data 228 based on the behavior and movements of the occupant 108. The cabin cameras 204 may be configured as visible light cameras, thermal cameras, and/or infrared cameras.

The front cabin camera 204 (i.e. the cabin camera 204 closest to the dashboard 144 in FIG. 1) defines a field of view 232 (FIG. 1) that includes at least the entire front occupant seats 140, the dashboard 144, the center console 156, and at least a portion of an interior floor 236 of the vehicle 100. The front cabin camera 204, in one embodiment, is mounted on the dashboard 144 and in another embodiment is mounted on an interior ceiling structure of the vehicle 100. The front cabin camera 204 is mounted in any location to position at least the entire front occupant seats 140, the dashboard 144, the center console 156, and at least a portion of the floor 236 within the field of view 232.

The images within the field of view 232, as generated by the front cabin camera 204, are included in the cabin image data 228.

The rear cabin camera 204 (i.e. the cabin camera 204 positioned farthest from the dashboard 144 in FIG. 1) defines a field of view 240 (FIG. 1) that includes at least the entire rear occupant seats 140 and at least a portion of the floor 236. The rear cabin camera 204, in one embodiment, is mounted on the interior ceiling structure of the cabin 132. The rear cabin camera 204 is mounted in any location to position at least the entire rear occupant seats 140 and at least a portion of the floor 236 within the field of view 240. The images within the field of view 240, as generated by the rear cabin camera 240, are included in the cabin image data 228.

In some embodiments, the litter sensing system 104 includes only one cabin camera 204 that is positioned to generate cabin image data 228 of the entire cabin 236 including all of the occupant seats 140. In other embodiments, the litter sensing system 104 includes three or more of the cabin cameras 204. For example, in a passenger van, minivan, or other vehicle having three or more rows of seats 140, each row of seats 140 may include a corresponding cabin camera 204. In yet another embodiment, each individual seat 140 of the vehicle 100 is monitored by an individual cabin camera 204. The litter sensing system 104 includes any number of the cabin cameras 204 as may be used to monitor the occupants 108 and/or seats 140 of the corresponding vehicle 100.

The mirror cameras 208 are digital imaging devices configured to generate window image data 244. In one embodiment, the mirror cameras 208 are surround-view cameras positioned to generate window image data 244 of the object 112 as the object 112 is thrown out of the window opening 116. The left mirror camera 208 is mounted on the left side mirror housing 160, and the right mirror camera 208 is mounted on the opposite right side mirror housing 160. The mirror cameras 208 may be configured as visible light cameras, thermal cameras, and/or infrared cameras.

As shown in FIGS. 1 and 2, the left mirror camera 208 defines a field of view 248 that includes the left side of the vehicle 100 including the entire window opening 116 of the front door 124 and the entire window opening 116 of the rear door 124. The right mirror camera 208 defines a field of view 252 that includes the right side of the vehicle 100 including the entirety of the corresponding other window openings 116. The fields of view 248, 252 of the mirror cameras 208, in at least one embodiment, also extend above a roof 256 (FIG. 2) of the vehicle 100 and to the ground on which the vehicle 100 is positioned. Since the fields of view 248, 252 of the mirror cameras 208 include the entirety of each window opening 116, any object 112 passed through one of the window openings 116 is detected by at least one of the mirror cameras 208. The images within the fields of view 248, 252 of the mirror cameras 208 are included in the window image data 244.

The transceiver 212, which is also referred to as a wireless transmitter and receiver, is configured to wirelessly transmit data from the vehicle 100 to another electronic device (not shown) and to wirelessly receive data from another electronic device via the Internet, for example. Thus, the transceiver 212 operably connects the vehicle 100 to the Internet and to other electronic devices. In other embodiments, the transceiver 212 sends and receives data using a cellular network, a wireless local area network ("Wi-Fi"), a personal area network, and/or any other wireless network. Accordingly, the transceiver 212 is compatible with any desired wireless communication standard or protocol including, but not limited to, Near Field Communication ("NFC"), IEEE 802.11, IEEE 802.15.1 ("Bluetooth®"), Global System for Mobiles ("GSM"), and Code Division Multiple Access ("CDMA").

The memory 216 is an electronic storage device that is configured to store at least the cabin image data 228, the window image data 244, and program instructions 260 for operating the litter sensing system 104. The memory 216 is also referred to herein as a non-transient computer readable medium.

The memory 216 is further configured to store window state data 264, door state data 268, and speed data 270. The window state data 264 are generated by the controller 220 based on signals received from the ECU 164, which is electrically connected to the window state sensors 170. The window state data 164 indicates which of the window panels 128 are in the open window state and which of the window panels 128 are in the closed window state at any particular time. Additionally or alternatively, the window state data 264 are generated by the ECU 164 and transmitted to the controller 220 for storage in the memory 216.

The door state data 268 are generated by the controller 220 based on signals received from the ECU 164, which is electrically connected to the door state sensors 174. The door state data 268 indicates which of the doors 124 are in the open door state and which of the doors 124 are in the closed door state at any particular time. Additionally or alternatively, the door state data 268 are generated by the ECU 164 and transmitted to the controller 220 for storage in the memory 216.

The speed data 270 correspond to a ground speed of the vehicle 100. The speed data 270 in one embodiment is generated by the controller 220 based on the signal from the speed sensor 178, as received by the controller 220 from the ECU 164. In another embodiment, the ECU 164 generates the speed data 270 and transmits the speed data 270 to the controller 220 for storage in the memory 216. The speed data 270, in some embodiments, also include data corresponding to a drive state of the vehicle 100. For example, the drive state may include a drive mode and a non-drive mode, and corresponding information is included in the speed data 270. The speed data 270 may indicate that the vehicle 100 is traveling at zero miles per hour in the park mode, traveling at ten miles per hour in the drive mode, or is stationary in the drive mode.

The drive mode is a drive state of the vehicle 100 in which the vehicle 100 is capable of being moved by the engine and/or the electric motor. In a passenger vehicle 100 the drive mode corresponds to putting the transmission in "D" for forward movement or in "R" for reverse movement. In an autonomous vehicle 100, the drive mode corresponds to any drive state of the vehicle 100 in which the vehicle 100 may use the engine and/or the motor to move the vehicle 100. The drive mode is contrasted with the non-drive mode, which is typically referred to as a neutral mode "N" or a park mode "P". The vehicle 100 is not drivable (manually or autonomously) in the non-drive mode.

The memory 216 also stores ejected object data 272 and littering event data 276. The ejected object data 272 are generated by the controller 220 based on the window image data 244. The ejected object data 272 include image data of the object 112 ejected, thrown, or dropped from the cabin 132 through one of the vehicle window openings 116. As shown in FIG. 2, the object 112 has been ejected from the cabin 132 by the occupant 108 through the window opening 116. The object 112 is within the field of view 248 of the mirror camera 208 and corresponding image data of the object 112 are included in the window image data 244. Based on processing performed by the controller 220, data corresponding to the ejected object 112 is identified, isolated, derived, and/or classified in the window image data 244 and is stored separately in the memory 216 as the ejected object data 272. That is, the window image data 244 includes all of the image data generated by the mirror cameras 208, and the ejected object data 272 includes the window image data 244 that includes images of the ejected object 112, as automatically identified by the controller 220.

The littering event data 276 stored in the memory 216 includes at least a portion of the ejected object data 272 and at least one of a date, a time, and a location at which the ejected objected 112 was ejected from the vehicle 100. The location is determined from an onboard global positioning system (not shown) of the vehicle 100, for example. The littering event data 276 when rendered on a suitable display (such as a computer monitor), is useful for a person to analyze to determine if a littering event has actually taken place or if the alleged object 112 was road debris or other non-litter elements.

In addition to the above, the memory 216 also stores occupant data 280, throwing motion data 284, and incoming object data 288. The occupant data 280 includes at least one of a name, address, and account number of the occupant 108. In another embodiment, the occupant data 280 include seat position data based on a position(s) of each occupant seat 140, and the occupant data 280 do not include identification data of the occupant 108. Instead, the vehicle sensing system 104 transmits the occupant data 280 to a fleet operator, for example, of the vehicle 100, and the fleet operator associates the occupant data 280 with personal identification data of the occupant 108. Thus, in at least some embodiments, personal identification data of the occupant 108 are not stored by the vehicle sensing system 104.

The throwing motion data 284 are identified, isolated, derived, and/or classified from the cabin image data 228 by the controller 220 and correspond to images of an arm or a hand of the occupant 108 moving toward the vehicle window opening 116 in a tossing or a throwing motion. Specifically, the throwing motion data 284 are a portion of the cabin image data 228 that have been identified by the controller 220 as including image data corresponding to an occupant 108 making a hand or arm movement that is consistent with throwing the object 112 out of the window opening 116. That is, the cabin image data 228 includes all of the image data generated by the cabin cameras 204, and the throwing motion data 284 includes the cabin image data 228 that includes images of arm and hand movements toward the window openings 116, as automatically identified by the controller 220. Identification and/or generation of the throwing motion data 284 is, at times, a precursor to a littering event, because the occupant 108 may be moving the object 112 to be ejected toward the window opening 116.

The incoming object data 288 is another portion of the cabin image data 228 corresponding to objects 112 moved into the cabin 132. For example, when the occupant 108 enters the vehicle 100 with a drink container (represented by the object 112), the cabin camera 204 generates corresponding cabin image data 228. The controller 220 processes the cabin image data 228 to identify, isolate, derive, and/or classify image data corresponding to elements (i.e. the object 112) brought into the cabin 132, according to the method 400 described below.

The controller 220 of the vehicle sensing system 104 is configured to execute the program instruction data 260 in order to operate the sensing system 104. The controller 220 is provided as at least one microcontroller and/or microprocessor. In one embodiment, the controller 220 is electrically connected to the ECU 164 by the CAN bus to receive one or more of the window state data 264, the door state data 268, and the speed data 270.

Figure 4:
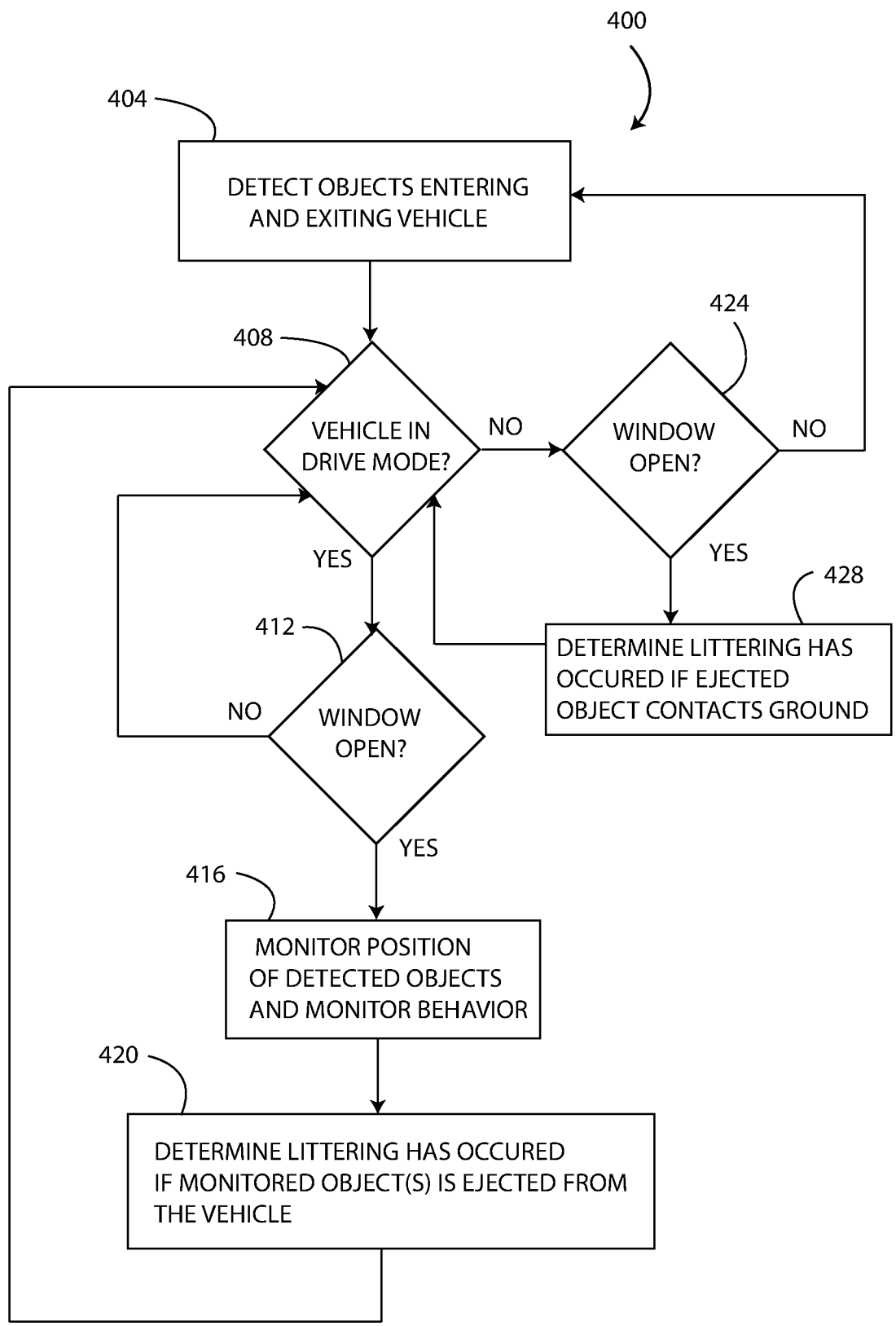
FIG. 4 is a flowchart illustrating an exemplary method of operating the system of FIG. 1 in order to detect objects ejected from the cabin of the vehicle.

In operation, the system 104 is configured to implement the method 400 illustrated by the flowchart of FIG. 4. In this exemplary embodiment, the vehicle 100 is a shared autonomous vehicle that is configured to drive autonomously to the location of an occupant 108, then upon the occupant 108 entering the vehicle 100, transport autonomously the occupant 108 to a desired location using the public roadway network. The occupant 108 may engage the services of the vehicle 100 using a smartphone application (i.e. an "app"), for example. The occupant 108 is also referred to herein as a passenger, a user, an operator, or a person. In other embodiments, the vehicle 100 is any type of passenger vehicle, as described above, and may be occupant 108 controlled.

In block 404 of the method 400, the vehicle 100 is stationary and the litter sensing system 104 detects the objects 112 entering and exiting the vehicle 100 through the open doors 124 using the cabin cameras 204. The system 104 determines that the vehicle 100 is stationary based on the speed data 270. Moreover, the system 104 determines which of the doors 124 is open (i.e. is in the open door state) based on the door state data 268. The system 104, in one embodiment, generates the incoming object data 288 only when at least one door 124 is in the open door state. The system 104 does not generate the incoming object data 288 when all of the doors 124 are closed. The system 104 generates the cabin image data 228 with the cabin cameras 204, which includes images of the occupant 108 and the object 112 entering cabin 132. The occupant 108 places the object 112, which in this example is a drink container or a coffee cup, in a cup holder, for example. The object 112 is in the field of view 232 of the front cabin camera 204.

The controller 220 processes the cabin image data 228 to generate the incoming object data 288, which, in this example, corresponds to the object 112. In one embodiment, the controller 220 uses computer vision object detection techniques to identify common objects in the cabin image data 228. The incoming object data 288 are a representation of each object 112 detected by the sensing system 104 as being brought into the cabin 132 through the open doors 124. In one embodiment, the system 104 distinguishes objects 112 from occupants 108 and identifies anything that is not an occupant 108 and is not the vehicle 100 as an incoming object 112.

At block 404, the system 104 may detect objects 112 exiting the vehicle 100 through the open doors 124 based on the cabin image data 228. When the vehicle 100 is in the non-drive mode (and is stationary) and an object 112 is detected as moving from the cabin 132 out of the fields of view 232, 240 of the cabin cameras 204 through an open door 124 or the window opening 116, the object 112 is removed from the incoming object data 288. The movement of an object 112 through an open door 124 is not processed by the system 104 as a littering event and does not result in the generation of the littering event data 276. This is because when objects are moved through the open doors 124, it is far more likely that the occupants 108 are unloading objects 112 from the vehicle 100 rather than littering or improperly disposing of the objects 112.

Next, in block 408 of the method 400, the controller 220 determines whether or not the vehicle 100 is in the drive mode and/or is moving. If the controller 220 determines that the vehicle 100 is in the drive mode, then the method 400 continues to block 412. The system 104 determines the state of the vehicle 100 and whether or not the vehicle 100 is in motion or stationary based on the speed data 270.

At block 412, the system 104 determines if any of the movable window panels 128, including a movable sunroof and/or moonroof movable window panel 128, are in the open window state based on the window state data 264. If the system 104 determines that all of the window panels 128 are closed, then the method 400 returns to block 408 to monitor the state of the vehicle 100 based on the speed data 270. The system 104 determines that a littering event cannot occur with the vehicle 100 in the drive mode and with all of the window panels 128 in the closed window state, because there are no openings through which to eject the object 112. If the system 104 determines that at least one window panel 128 is in the open window state, then the method 400 progresses to block 416.

At block 416, the system 104 monitors the position of the objects 112 as well as the behavior and the movements of the occupants 108 because a littering event could potentially occur. That is, at block 416, the vehicle 100 is in the drive mode and at least one window panel 128 is in the open window state. Thus, an opening exists through which the occupant 108 may eject the object 112 from the vehicle 100 and the occupant 108 is unlikely to be loading or unloading the vehicle 100 with the vehicle in the drive mode. The object 112 is representative of any element within the vehicle 100 that could be thrown out of a window opening 116 and includes personal items, trash, food, and the like.

In one embodiment, at block 416, the controller 220 compares the window image data 244 to the incoming object data 288 to determine the ejected object data 272. In particular, the controller 220 stores image data of each object 112 that is brought into the cabin 132 by processing the cabin image data 228 and by generating the incoming object data 288. Then, at block 416, the controller 220 processes the window image data 244 for data corresponding to the objects 112 of the incoming object data 288. If any objects 112 of the incoming object data 288 are detected in the window image data 244, the controller 220 determines that the corresponding object 112 has been ejected from the cabin 132 through the window opening 116.

As an example, when the object 112 is loaded into the cabin 132, the controller 220 generates incoming object data 288 corresponding to images of the object 112. Then, when the vehicle 100 is in the drive mode, the controller 220 processes the window image data 244 using computer vision techniques to search for corresponding images of the object 112 in the window image data 244. If the controller 220 identifies a match between the object 112 in the window image data 244 and the object 112 in the incoming object data 288, then the ejected object data 272 is generated and includes images of the object 112 that was ejected from the vehicle 100 from the window image data 244. In one embodiment, in order for the object 112 to appear and to be detected in the window image data 244 it must have been ejected from the vehicle 100, because the fields of view 248, 252 of the mirror cameras 208 are located only outside of the cabin 132 of the vehicle 100 and do not include any portion of the cabin 132.

In another embodiment, the controller 220 processes only the window image data 244 to generate the ejected object data 272 without generating the incoming object data 288. Thus, in some embodiments, the incoming object data 288 is not required. The window image data 244 is generated only when the system 104 detects that a window panel 128 is in the open window state. In this embodiment, the controller 220 uses computer vision techniques to detect the object 112 in a corresponding field of view 248, 252 of the mirror cameras 208. Much of the images generated as the window image data 244 are static images of the side of the vehicle 100. Thus, to detect the object 112 in the window image data 244, a subtractive approach may be employed by the controller 228 to identify differences between images of the side of the vehicle 100 with no objects 112 present in the fields of view 248, 252, and images of the side of the vehicle 100 that include an object 112 in at least one of the fields of view 248, 252.

Moreover, additional or alternative image processing techniques may be used to identify the object 112 in the window image data 244. For example, the controller 220 processes the window image data 244 for any element that tracks front-to-back along the side of the vehicle 100, as would the object 112 when it is ejected from the vehicle 100. When such image data is detected, the corresponding window image data 244 is saved to the ejected object data 272.

The controller 220, in one embodiment, is additionally or alternatively configured to identify as ejected object data 272, objects 112 in the window image data 244 that are detected as bouncing on the road or falling from the vehicle 100 and hitting the road. Such a track in the window image data 244 has a downward trajectory along the exterior of the door 124 and is indicative of an ejected object 112.

When processing the window image data 244, the controller 220, in at least one embodiment, is configured to ignore image data corresponding to the hand or the arm of the occupant 108 resting on the window opening 116. Such an approach reduces false-positive littering event data 276.

Additionally or alternatively, at block 416 the system 104 uses the throwing motion data 284 as a trigger for starting to generate and to process the window image data 244. For example, when ejecting the object 112 from the cabin 132, the occupant 108 grabs the object 112 and moves the object 112 towards the window opening 116 with a throwing or a tossing motion. Such a movement of the occupant 108 and the object 112 is depicted in FIG. 1. The controller 220 detects the throwing motion as the throwing motion data 284 from the cabin image data 228. Upon the detection of the throwing motion data 284, the controller 220 starts generating the window image data 244 because an ejected object 112 may be forthcoming. In this manner, the system 104 does not continuously generate the window image data 244, but instead only generates the window image data 244 after the detection of throwing motion data 284 and when at least one window panel 128 is in the open window state. Such an approach also tends to reduce the amount of false-positive littering event data 276.

In a further embodiment at block 416, the controller 220 processes the cabin image data 228 to detect if any object 112 is moved toward a window opening 116. Accordingly, instead of or in addition to detecting the throwing motion data 284, the position of each object 112 within the cabin 132 is monitored and determined by the controller 228. When any object 112 is determined to have been moved sufficiently toward or near the window opening 116, then the controller 220 starts to generate the window image data 244 because an ejected object 112 may be forthcoming. In one embodiment, when an object 112 detected in the cabin image data 228 is moved within a distance threshold from the window opening 116, then the controller 220 begins to generate the window image data 244. The distance threshold is from two to twelve inches, for example.

In yet another embodiment at block 416 of the method 400, the controller 220 only generates the window image data 244 using a selected one of the plurality of mirror cameras 20. For example, if only the front left window panel 128 is in the open window state (as shown in FIG. 2), then the controller 220 generates the window image data 244 with only the left mirror camera 208 and does not generate the window image data 244 with the right mirror camera 208 because an object 112 cannot be ejected from the right side of the vehicle 100 due to all of the window panels 128 being in the closed window state.

Moving to block 420 of the method 400, the controller 220 determines if littering has occurred and generates the littering event data 276. In particular, the system 104 generates the littering event data 276 by associating the ejected object data 272 with at least one of a time, a data, and a location of the vehicle 100. Moreover, the littering event data 276 includes the occupant data 280, which may include the operator's account number, name, residential address, email address, and/or workplace. Thus, the controller 220 associates the ejected object data 272 with the occupant data 280 when generating the littering event data 276. In some embodiments, frames of the cabin image data 228 are included in the littering event data 276 to connect further the ejected object 112 with a specific occupant 108 included in the cabin image data 228. Specifically, images of the occupant's face may be saved and cataloged in the littering event data 276 in order to identify the occupant 108. In another embodiment, the occupant data 280 do not include personal identification data of the occupant 108 and the occupant data 280 include only vehicle 100 state data, such as seat position data, for example.

Also at block 420, in one embodiment, the system 104 uses the display screen 148 and/or the speaker 152 to alert the occupant 108 that littering has been detected. When the littering event data 276 is generated, the controller 220 sends the ejected object data 272 and/or the littering event data 276 to the display screen 148 for display to the occupant 108. The display screen 148, for example, shows the occupant 108 images of the ejected object 112 and a message may be broadcast on the speaker 152 requesting the occupant 108 to cease all littering activity. The display screen 148 and/or the audio message may further inform the occupant 108 that they will face a service charge due to the ejection of the object 112 from the vehicle 100. The display screen 148 and/or the audio message may additionally or alternatively inform the occupant 108 that they can no longer utilize the vehicle 100 for future transportation needs so as prevent occupants 108 that are known to litter from littering again. In further embodiments, when litter is detected, an account of the occupant 108 may be revoked or changed until appropriate steps have been taken to rectify the detected littering event, such as paying the service charge, cleaning up the litter, and/or performing a certain number of community service hours.

The littering event data 276, in one embodiment, is transmitted to a remote location by the transceiver 212 for processing and storage. For example, when littering event data 276 is received at the remote location a human analyst may review the ejected object data 272 to determine if actual littering has occurred or if the littering event data 276 was based on a false detection.

With reference still to FIG. 4, if at block 408 the controller 220 determines that the vehicle 100 is not in the drive mode (i.e. is in the non-drive mode), then the method 400 continues to block 424. At block 424, the system 104 again determines if any of the movable window panels 128, including a movable sunroof and/or moonroof movable window panel 128, are in the open window state based on the window state data 264. If the system 104 determines that all of the window panels 128 are in the closed window state, then the method 400 returns to block 404 to detect the objects 112 entering and exiting the vehicle 100 through the open doors 124 (if any) using the cabin cameras 204. If the system 104 determines that at least one window panel 128 is in the open window state in block 424, then the method 400 progresses to block 428.

At block 428, the controller 220 process the window image data 244 to identify as littering, objects 112 that are ejected through the window openings 116 and that contact the ground on which the vehicle 100 is positioned. The corresponding window image data 244 is stored as the littering event data 276 in the manner described above. Thereafter, the method 400 continues to block 408 to monitor if the vehicle 100 is in the drive mode.

The processing steps that occur at block 428 account for numerous use cases including drive-through businesses, automatic teller machines ("ATM"), and passing items to people outside of the vehicle 100, and serve to prevent false-positive litter detection by the system 104. Specifically, in the use case of a drive-through business, the occupant 108 of the vehicle 100 passes payment to a person outside of the vehicle 100 through the window opening 116 and in exchange receives items from the person outside of the vehicle 100 through the window opening 116. Neither the payment nor the received items contact the ground on which the vehicle 100 is located and accordingly, the movement of the payment and the received items is not littering and should not be detected as littering by the system 104. Similarly, when using a trashcan located outside of the vehicle 100, the occupant 108 moves an object through the window opening 116 and drops the object into the trashcan. The discarded object does not contact the ground and is not littering. In a littering event, however, the occupant 108 passes or throws the object 112 through the window opening 116 and the object 112 falls to the ground. The ejected object 112 falls from the window opening 116 and strikes the ground. The controller 220, therefore, is configured to process the window image data 244 to detect data corresponding to objects 112 that pass through the window opening 116 and then fall to the ground, since such data are very likely to correspond to littering events. The corresponding window image data 244 are included in the littering event data 276.

Prior to or during the processing step of block 428, the method 400 may also include the processing step of block 416 to monitor the position of the detected objects 112 and/or to monitor the behavior of the occupants 108 within the vehicle 100.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. A method for detecting objects ejected from a cabin of a vehicle, comprising:
generating window image data of a vehicle window opening of the vehicle with a camera mounted on the vehicle;
processing the window image data using a controller operably connected to the camera to generate ejected object data corresponding to at least one object ejected from the cabin through the vehicle window opening; and associating the ejected object data with occupant data of an occupant of the vehicle using the controller.

2. The method as claimed in claim 1, further comprising:
detecting a state of a movable window panel that is movable within the vehicle window opening with at least one window state sensor of the vehicle, the detected state including an open window state and a closed window state; and generating the window image data only when the movable window panel is in the open window state.

3. The method as claimed in claim 2, wherein the camera mounted on the vehicle is a first camera, and the method further comprises:
generating cabin image data of the cabin of the vehicle with a second camera mounted inside the cabin, the cabin image data at least partially based on movements of the occupant within the cabin;

processing the cabin image data using the controller to detect throwing motion data corresponding to a motion of an arm or a hand of the occupant toward the vehicle window opening; and generating the window image data only when the movable window panel is in the open window state and the throwing motion data are detected.

4. The method as claimed in claim 1, further comprising:
generating the window image data with the camera mounted outside of the cabin.

5. The method as claimed in claim 4, wherein the camera is mounted directly on a side mirror housing of the vehicle.

6. The method as claimed in claim 1, further comprising;
generating littering event data based on the generated ejected object data and the occupant data using the controller, wherein the littering event data includes image data of the ejected object and at least one of a date, a time, and a location at which the ejected objected was ejected from the vehicle.

7. The method as claimed in claim 1, wherein the camera mounted on the vehicle is a first camera, and the method further comprises:
generating incoming object data with a second camera mounted in the cabin, the incoming object data corresponding to incoming objects placed in the cabin by the occupant; and identifying the incoming objects in the window image data using the controller as the at least one object is ejected from the cabin, wherein the first camera is mounted outside of the cabin.

8. The method as claimed in claim 7, further comprising:
detecting a state of at least one door of the vehicle, the detected state including an open door state and a closed door state; and generating the incoming object data only when the at least one door is in the open door state.

9. The method as claimed in claim 1, wherein the ejected object data include image data of the at least one object.

10. The method as claimed in claim 9, further comprising:
assessing a service charge to the occupant of the vehicle.

11. A method for detecting objects ejected from a cabin of a vehicle, comprising:
generating window image data of a vehicle window opening when a corresponding movable window panel is in an open position;

processing the window image data to generate ejected object data corresponding to objects ejected from the cabin through the vehicle window opening;

generating littering event data based on the generated ejected object data; and associating the littering event data with an occupant of the vehicle.

12. The method as claimed in claim 11, further comprising:
detecting a state of the movable window panel, the detected state including an open window state corresponding to the open position and a closed window state corresponding to a closed position of the movable window panel; and generating the window image data only when the movable window panel is in the open window state.

13. The method as claimed in claim 12, further comprising:
generating the window image data with a first camera mounted outside the cabin;

generating cabin image data of the cabin of the vehicle with a second camera mounted inside the cabin, the cabin image data at least partially based on movements of the occupant within the cabin;

processing the cabin image data to detect throwing motion data corresponding to a motion of an arm or a hand of the occupant toward the vehicle window opening; and generating the window image data only when the movable window panel is in the open window state and the throwing motion data are detected.

14. The method as claimed in claim 11, further comprising:
generating the window image data with a camera mounted outside of the cabin.

15. The method as claimed in claim 14, wherein the camera is mounted directly on a side mirror housing of the vehicle.

16. A system for detecting objects ejected from a cabin of a vehicle, comprising:
a camera mounted on the vehicle and configured to generate window image data of a vehicle window opening; and a controller operably connected to the camera to receive the window image data, the controller configured (i) to process the window image data to generate ejected object data corresponding to at least one object ejected from the cabin through the vehicle window opening, and (ii) to associate the ejected object data with occupant data of an occupant of the vehicle.

17. The system as claimed in claim 16, wherein the camera mounted on the vehicle is a first camera, further comprising:
a second camera mounted on the vehicle and configured to generate cabin image data of the cabin of the vehicle, the cabin image data at least partially based on movements of the occupant within the cabin, wherein at least one window state sensor of the vehicle is configured to detect a state of a movable window panel that is movable within the vehicle window opening, the detected state including an open window state and a closed window state, and wherein the controller is further configured (i) to process the cabin image data to detect throwing motion data corresponding to a motion of an arm or a hand of the occupant toward the vehicle window opening, and (ii) to generate the window image data only when the movable window panel is in the open window state and the throwing motion data are detected.

18. The system as claimed in claim 17, wherein:
the first camera is located within the cabin, and
the second camera is mounted directly on a side mirror housing of the vehicle.

19. The system as claimed in claim 16, wherein:
the controller is configured to generate and to send the ejected object data to a display screen of the vehicle, and
the display screen is operably connected to the controller and is configured to display a message to the occupant based on the ejected object data.

20. The system as claimed in claim 19, wherein the message instructs the occupant to stop littering.

* * * * *

UNITED STATES PATENT AND TRADEMARK OFFICE
CERTIFICATE OF CORRECTION

PATENT NO. : 11,130,446 B2  
APPLICATION NO. : 16/601742  
DATED : September 28, 2021  
INVENTOR(S) : Wildemann It is certified that error appears in the above-identified patent and that said Letters Patent is hereby corrected as shown below:

In the Claims

In Claim 6, at Column 13, Line 39: "ejected objected" should read --ejected object--.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*